(12) United States Patent
Harger et al.

(10) Patent No.: US 7,658,420 B2
(45) Date of Patent: Feb. 9, 2010

(54) QUICK-CONNECT FITTING WITH UNLOCKING RING

(75) Inventors: Keith R. Harger, Kalamazoo, MI (US); Gregory Kreczko, Kalamazoo, MI (US)

(73) Assignee: Parker-Hannifin Corporation, Cleveland, OH (US)

( * ) Notice: Subject to any disclaimer, the term of this patent is extended or adjusted under 35 U.S.C. 154(b) by 129 days.

(21) Appl. No.: 11/777,642

(22) Filed: Jul. 13, 2007

(65) Prior Publication Data

US 2008/0012314 A1 Jan. 17, 2008

Related U.S. Application Data

(60) Provisional application No. 60/807,207, filed on Jul. 13, 2006.

(51) Int. Cl.
*F16L 37/18* (2006.01)

(52) U.S. Cl. .......................................... 285/314; 285/86

(58) Field of Classification Search ................... 285/86, 285/314, 315, 316, 319
See application file for complete search history.

(56) References Cited

U.S. PATENT DOCUMENTS

| | | | | |
|---|---|---|---|---|
| 1,966,718 A | * | 7/1934 | Hanson | 285/314 |
| 2,004,967 A | * | 6/1935 | Williams | 285/314 |
| 2,470,256 A | * | 5/1949 | McIlroy | 285/314 |
| 5,131,687 A | * | 7/1992 | Marchou | 285/314 |
| 5,330,235 A | | 7/1994 | Wagner et al. | |
| 6,499,772 B1 | | 12/2002 | Minemyer | |
| 6,554,320 B2 | * | 4/2003 | Cresswell | 285/314 |
| 2005/0179258 A1 | | 8/2005 | Brandt et al. | |

FOREIGN PATENT DOCUMENTS

| | | |
|---|---|---|
| DE | 37 27 858 A1 | 1/1989 |
| DE | 38 43 995 C1 | 6/1990 |
| GB | 2 227 064 A | 7/1990 |

\* cited by examiner

*Primary Examiner*—David E Bochna
(74) *Attorney, Agent, or Firm*—Renner, Otto, Boisselle & Sklar, LLP (57) ABSTRACT

A quick-connect coupling having a rotatable release member that is movable between a locked position whereat the plug-to-connect coupling is locked in a coupled state, and a release position whereat the quick-connect coupling can be decoupled. The coupling can be operated with one hand as the release member can remain in an unlocked position (e.g., the release position) when moved to such position and released.

26 Claims, 8 Drawing Sheets

QUICK-CONNECT FITTING WITH UNLOCKING RING

RELATED APPLICATIONS

This application claims the benefit of U.S. Provisional Application No. 60/807,207 filed Jul. 13, 2006, which is hereby incorporated herein by reference in its entirety.

FIELD OF THE INVENTION

The invention herein described relates generally to quick-connect fittings.

BACKGROUND OF THE INVENTION

Quick-connect couplings, which include plug-to-connect or push-in couplings, heretofore have been provided to allow for quick connection and sealing of a coupler socket (female half) and a nipple (male half). Such couplings have particular application for connecting tubes to one another or a tube to another component such as a manifold block.

In a typical plug-to-connect coupling, the male and female parts are connected together simply by pushing the male part into the female part. This has the advantage of permitting the parts to be very quickly and easily coupled.

Latch mechanisms are often provided on one or both of the male and female parts for maintaining the parts in a connected (coupled) state. Such latch mechanisms are typically configured to automatically engage when the male part is coupled with the female part, and act to restrict withdrawal of the male part from the female part.

Quick-connect couplings also have been provided with a release mechanism to disconnect the male and female parts. Prior art release mechanisms have required the use of a special tool which presents some drawbacks. Perhaps the most common drawback, especially when the coupling is infrequently disconnected, is misplacement of the special tool such that it cannot be found when needed. If the special tool cannot be found, service personnel may be inclined to use some other tool that is handy, and this could cause damage to the coupling such that the male and female parts might not mate and/or seal properly when re-connected. Another drawback is the need to use two hands to effect the release, one to hold the coupling part that is being disconnected and the other to hold the special tool, or any tool for that matter. This can be a difficult and tedious task if the coupling is located in a hard to reach location.

U.S. Patent Application Publication No. 20050179258 discloses a plug-in coupling having two coupling parts connectable to one another. The parts have coordinated catches for locking the parts in a coupled state. A separate release part is provided for separating the locking connection between the catches of the first coupling part and the catches of the second coupling part. In general, the release part is configured to deform in such a manner, when pressure is applied thereto by a user, so as to separate the locking connection between the catches. To operate the release part, a user typically squeezes the release part at two diametrically opposed locations to thereby separate the locking connection while withdrawing the male portion from the female portion. This can make one-handed operation somewhat cumbersome, as the release part must be operated while withdrawing the male part from the female part.

SUMMARY OF THE INVENTION

The present invention provides a quick-connect coupling that is lockable in a connected state and includes a rotatable release member that is movable to a release position whereat the quick-connect coupling can be decoupled. Unlike typical quick-connect couplings, the coupling can be operated easily with one hand as the release member can remain in an unlocked position (e.g., the release position) when moved to such position and released.

Accordingly, a quick-connect coupling is provided having first and second coupling parts and an interlock mechanism that engages when the coupling parts are connected to restrict disconnection. A rotatable release member, when in a locked position, restricts the interlock mechanism from disengaging and, when in a release position, permits the interlock mechanism to disengage.

More particularly, a quick connect coupling comprises first and second coupling parts connectable to each other for enabling fluid communication between respective fluid flow passages of the first and second parts. An interlock mechanism for interlocking the coupling parts in a connected state includes a catch associated with one of the coupling parts and a latch member associated with the other of the coupling parts. The latch member is configured to interlock with the catch when the first and second coupling parts are connected to thereby restrict disconnection of the coupling parts. A rotatable release member on one of the first or second coupling parts is rotatable between a first position allowing the latch member to interlock with the catch and a second position holding the latch member in an unlatching position to allow separation of the first and second coupling parts.

In one embodiment, the release member has a cam surface for engaging a follower surface on the latch member, whereby the latch member will be progressively urged to the unlatching position as the release member is rotated to the release position. The latch member can be cantilevered and can extend axially from a body of the coupling with which the latch is associated. The cam surface can be radially interposed between the latch member and a body of the coupling. A stop surface on the rotatable release member is engageable with a cooperating surface on the latch member for preventing rotation of the rotatable member beyond the release position.

The rotatable release member can further comprise a lock member configured to restrict movement of the latch member out of engagement with the catch. The lock member can be cantilevered and can extend circumferentially and spaced apart from an annular body of the rotatable member, and have a radially inner surface configured to engage a radially outer surface of the latch member. The lock member and body together define a slot into which at least a portion of the latch is received when in the lock position.

Cooperative lock-out members associated with each of the coupling parts for preventing cross-coupling of at least one of the first or second coupling parts with a different respective coupling part can also be provided. The cooperating lockout members can include an axial protrusion on one coupling part configured to be received in an axial recess of the other coupling part to permit connection of the coupling parts but prevent connection of other coupling parts without such protrusion or groove. Another lock-out mechanism that can be provided includes a rotatable release member having a given axial thickness, the axial thickness of the rotatable release member determining whether the coupling part associated with the rotatable release member will couple with another coupling part.

The foregoing and other features of the invention are hereinafter described in detail in conjunction with the accompanying drawings which set forth exemplary embodiments illustrating a few of the various ways in which the principles of the invention may be employed.

DETAILED DESCRIPTION

Figure 1:
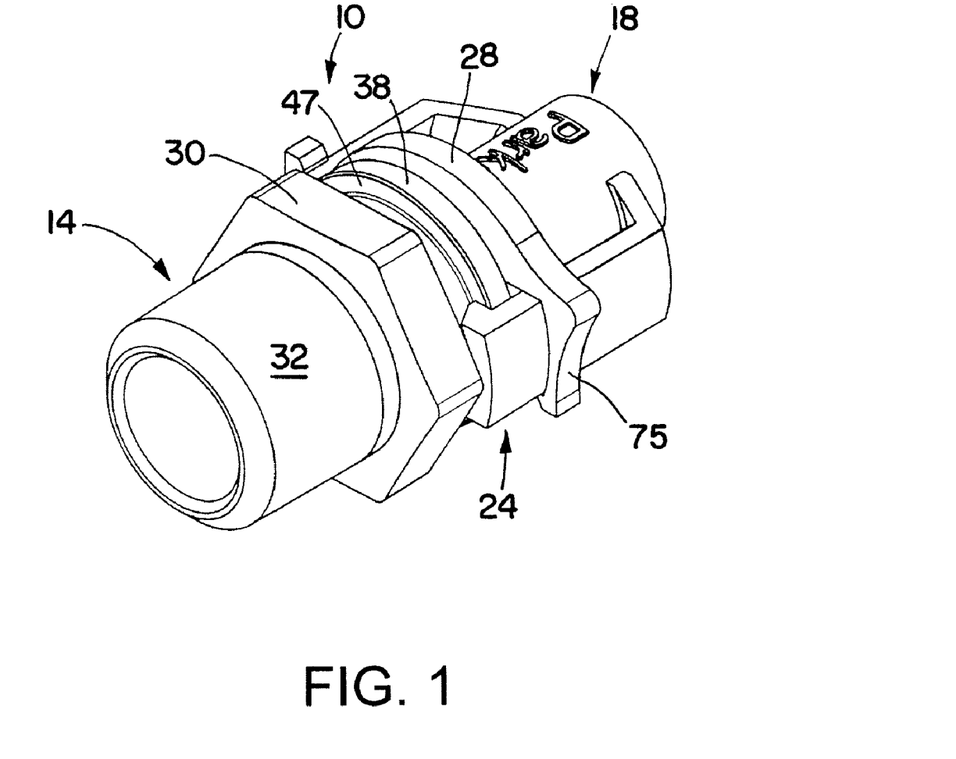
FIG. 1 is a perspective view of an exemplary quick-connect coupling having a rotatable release member in accordance with the present invention.
Figure 2:
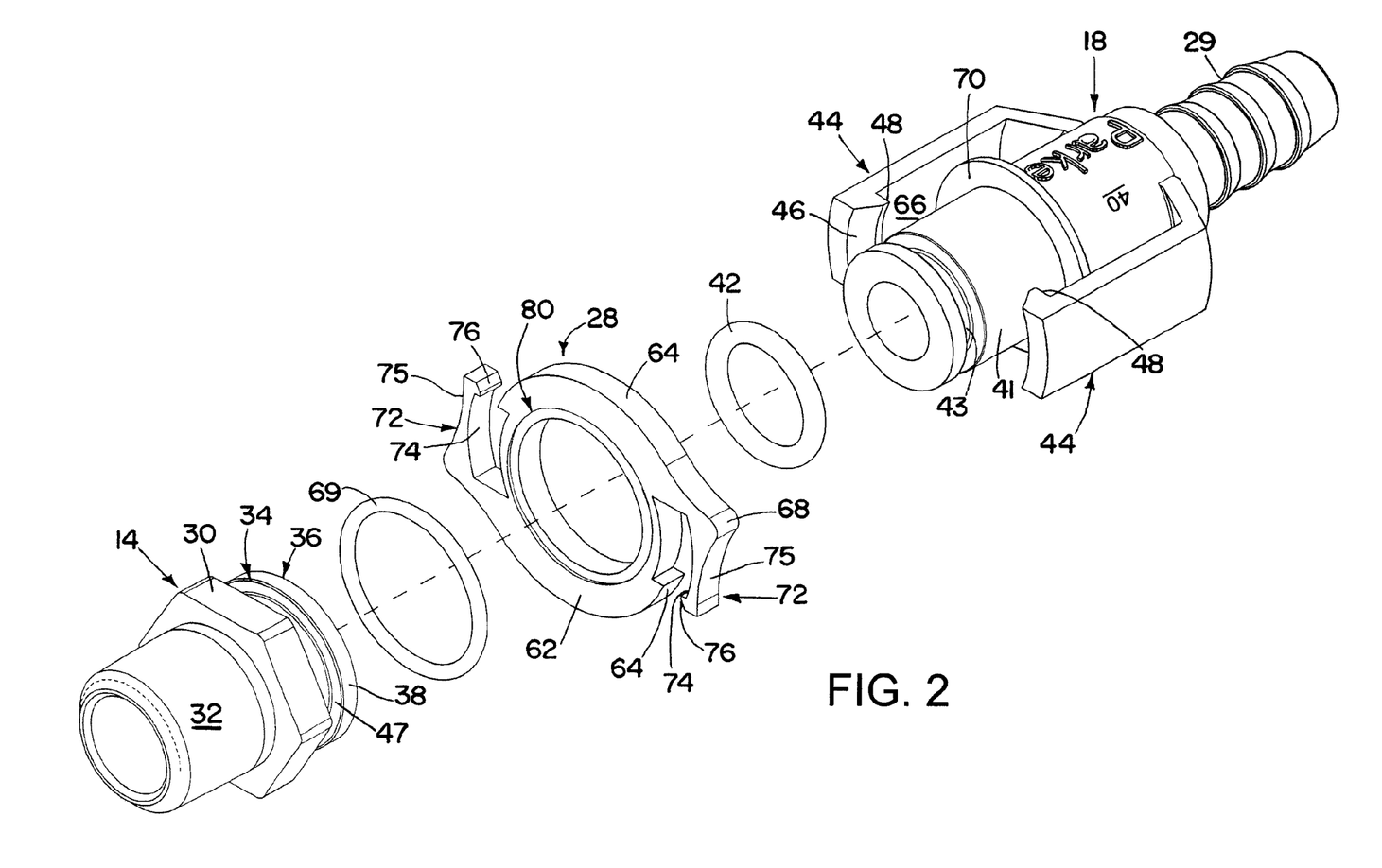
FIG. 2 is an exploded perspective view of the quick-connect coupling of FIG. 1.

Referring now in detail to the drawings, and initially to FIGS. 1 and 2, an exemplary quick-connect coupling according to the invention is indicated generally by reference numeral 10. The coupling 10 generally comprises a female coupling part 14, a male coupling part 18, an interlock mechanism 24, and a rotatable release member 28. The female 14 and male 18 parts can be configured for attachment to other components of a fluid transfer system such as a tube, hose, manifold, etc. For example, the female part 14 may be fastened to a manifold, and the male part 18 may be fastened to the end of a tube, such as a hose or tubing. In this regard, the female part 14 and male part 18 can have threads (not shown) on an exterior or interior surface thereof for making threaded connection to other components. In FIG. 2, the male part 18 includes a ribbed nipple 29 for attaching the male part 18 to a hose. Of course, other means of attaching the coupling parts to other components can be employed. In addition, the female part 14 (or male part 18) may be provided with a hex collar 30 for facilitating fastening of the parts to other components. The coupling 10 may be used in any of a variety of applications to provide a quick plug-to-connect connection, while also providing a rotate-to-release feature as hereinafter discussed.

The female part 14, which may be made of any suitable material (e.g., metal or plastic), has a body 32 that includes a socket 34 that opens to an axial end of the female part 14. The socket 34 is configured to receive a nipple 41 of the male part 18 as will be described. A catch 38 extending radially outwardly from the body 32 circumscribes the socket 34. In the illustrated embodiment, the catch 38 is radially extending continuous flange, but other catch configurations are possible.

Figure 3:
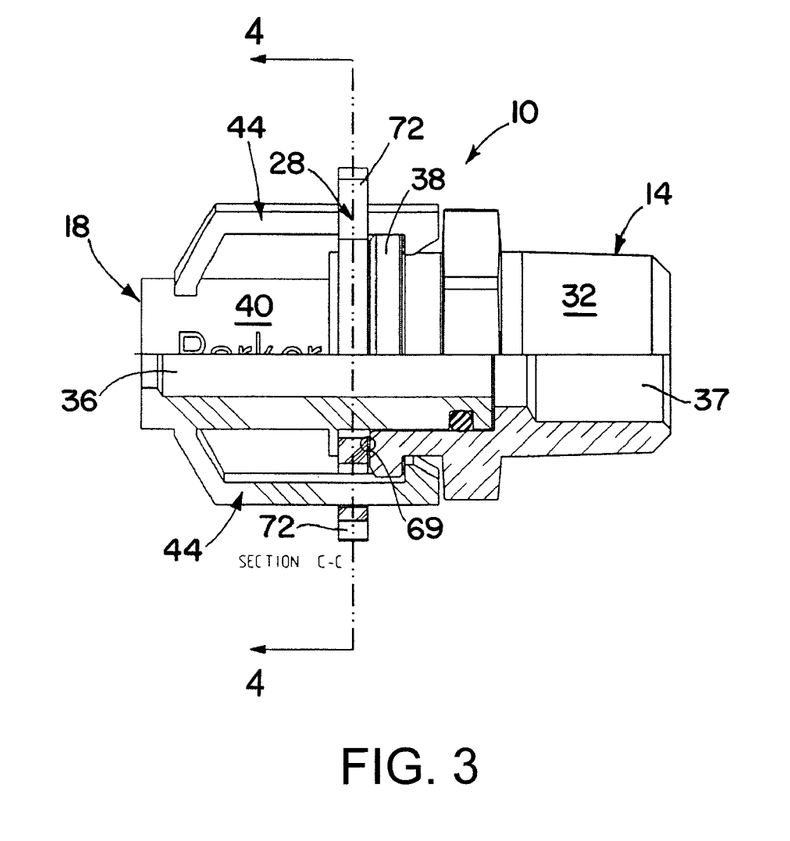
FIG. 3 is a side view of the quick-connect coupling of FIG. 1, partly broken away in section.

With further reference to FIG. 3, the male part 18, which also may be made of any suitable material (e.g., metal or plastic), is telescopically insertable into the socket 34 in the female part 14 for enabling fluid communication between respective fluid flow passages 36 and 37 in the female 14 and male 18 parts. The male part 18 has a body 40 that includes the nipple portion 41 that is insertable into the socket 34 of the female part 14. A seal, such as O-ring 42, is adapted to be received in annular groove 43 in the nipple portion 41 for sealing the male part 18 to a radially inner surface of the socket 34 of the female part 14 when inserted therein. Latch members 44 extend axially and are spaced apart from the body 40 in a cantilevered configuration.

The latch members 44 have, at a distal end thereof, radially inwardly protruding catch portions having a leading inclined surface 46 and a trailing catch engaging surface 48. When in the latching position, such as shown in FIGS. 1-3, the leading inclined surface 46 of the latch members 44 will engage the catch 38 on the female coupling part 14 during connection of the female 14 and male 18 coupling parts. As the inclined surfaces 46 contact the catch 38, the latch members 44 are urged radially outwardly to allow the catch 38 to pass thereby. Once the male coupling part 18 is inserted a sufficient distance into the female part 14, the inclined surfaces 46 clear the catch 38 and the latch members 44 can contract radially inwardly thereby allowing the trailing catch engaging surfaces 48 to interlock with a latching surface 47 of the catch 38 thereby preventing withdrawal of the male coupling part 18 from the female coupling part 14. It will be appreciated that the catch 38 and latch members 44 together form the interlock mechanism 24 for interlocking the coupling parts in a connected state.

To enable disconnection of the coupling parts, the rotatable release member 28 is provided. The rotatable release member 28 in the illustrated embodiment is supported on a cylindrical portion of the male coupling 18 and is rotatable between a latching position allowing the latch members 44 to interlock with the catch 38 and a release position holding the latch members 44 in an unlatching position so as to permit separation of the male 18 and female 14 parts.

The rotatable release member 28 has a generally annular body 62 having a pair of cam surfaces 64 on an outer periphery thereof for engaging follower surfaces 66 on the latch members 44. As shown in FIG. 1, the annular body 62 is supported on a cylindrical portion of the male coupling part 18 with the cam surfaces 64 thereof disposed radially inwardly of the latch members 44 so as to progressively urge the latch members 44 from a latching position to an unlatching position as the release member 28 is rotated to the release position. The rotatable member 28 further includes a pair of stop knurls 68 on its outer periphery for restricting rotation of the rotatable release member 28 beyond a certain position.

A seal, such as o-ring 69, can be provided for sealing an axial end face of the rotatable release member 28 against an end face of the female coupling part 14 to prevent dust and/or other contaminants from entering the coupling 10. The seal 69 can be a separate seal as illustrated, or can be integrally molded to the rotatable release member 28. For example, the seal 69 could be a circumferential resilient seal overmolded on an axial end face of the rotatable release member 28.

The rotatable release member 28 further includes first and second lock members 72 configured to restrict movement of respective latch members 44 out of the latching position when the rotatable release member 28 is in the locked position. The lock members 72 in the illustrated embodiment extend in a cantilevered like manner from the body 62 of the rotatable member 28 and have a radially extending portion and a circumferentially extending portion spaced apart from the annular body 62 of the rotatable member 28. Each lock member 72 is configured to radially restrain a respective latch member 44 against radial outward movement when the rotatable release member 28 is rotated to the lock position.

The lock members 72 can be provided with catches 74 as illustrated for engaging corresponding surfaces on the latch members 44 to restrict movement of the rotatable release member 28 when in the latching position. The catches 74 extend radially inwardly to engage a side surface the respective latch member 44.

The lock members 72 can further include concave radially outer surfaces 75 that form finger depressions for facilitating rotation of the rotatable release member 28.

Figure 4:
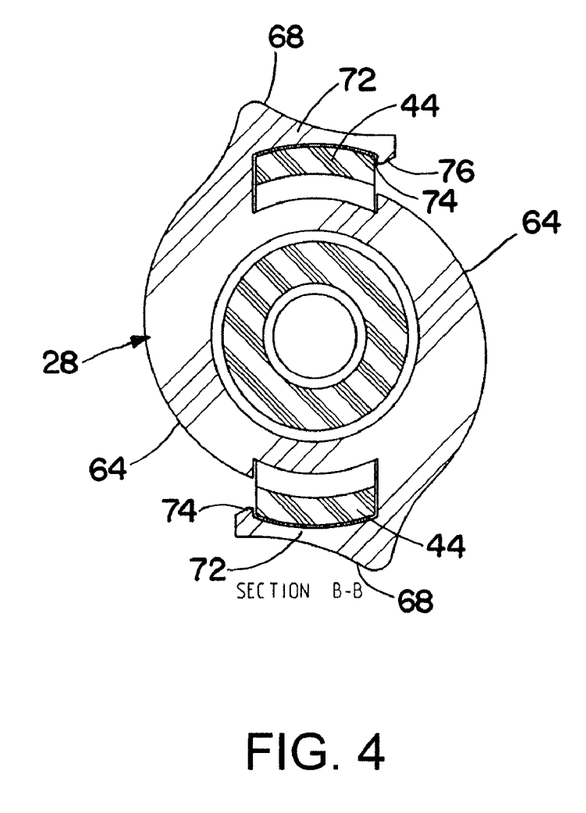
FIG. 4 is a cross-sectional view of the quick-connect fitting taken along the line 4-4 in FIG. 3 showing the rotatable release member in a locked position.

Turning now to FIGS. 3-8, and initially to FIGS. 3 and 4, the operation of the rotatable release member 28 will be described. As illustrated in FIGS. 3 and 4, the male 18 and female 14 coupling halves are connected and the latch members 44 are engaged with the catch 38. As best seen in FIG. 4, the rotatable release member 28 is in the lock position whereby the lock members 72 restrict radially outward movement of the latch members 44 from the latching position.

Figure 5:
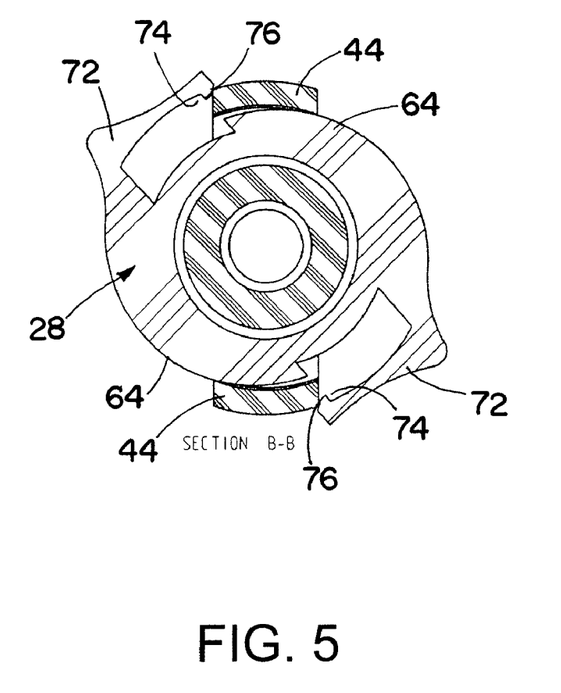
FIGS. 5 and 6 are cross-sectional views, similar to FIG. 4, of the quick-connect coupling with the rotatable release member in different positions.
Figure 6:
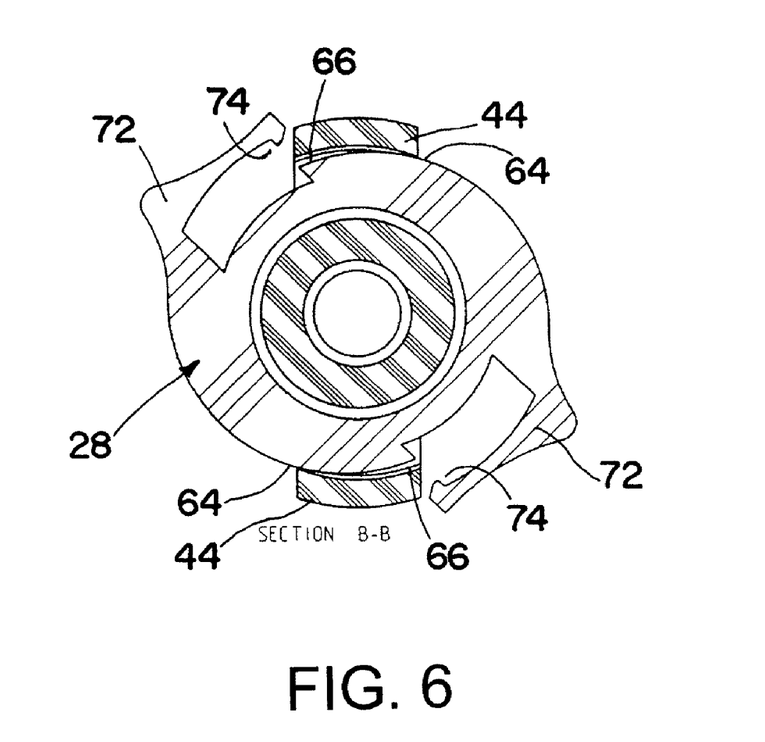

Turning to FIG. 5, the rotatable release member 28 has been rotated in the counterclockwise direction from the position shown in FIG. 4. In order for the catches 74 on the lock members 72 to clear the latch members 44, the distal ends of the lock members 72 having the catches 74 are configured to flex radially outwardly when a rotational force is applied to the radially outer curved surfaces of the lock members 72. Accordingly, for a rotatable release mechanism 28 equipped with lock arm catches 74 as illustrated, prior to rotation of the rotatable release member 28 a threshold rotational force will typically be required to radially expand the lock members 72 to allow the lock member catches 74 to clear the latch members 44 and the rotatable release member 28 to rotate.

Once the lock member catches 74 clear the latch members 44 and the rotatable release member 28 is rotated counterclockwise a sufficient amount, the cam surfaces 64 of the rotatable release member 28 engage respective follower surfaces 66 of the latch members 44. Accordingly, as the rotatable release member 28 is rotated further to the position of FIG. 6, and finally to the position shown in FIGS. 7 and 8, the cam surfaces 64 urge the latch members 44 radially outward away from the catch 38 to the unlatching position whereat the male coupling part 18 can be withdrawn from the female coupling part 14.

It will be appreciated that the cam surfaces can provide a mechanical advantage so as to make moving the latch members 44 to the unlatching position easier than would otherwise be the case. Thus, the rotatable release member 28 may make it possible to provide latch members 44 that are more rigid (e.g., more difficult to urge to the unlatching position) and, consequently, more likely to remain in the latching position, but still allow easy disconnection of the coupling parts.

Figure 7:
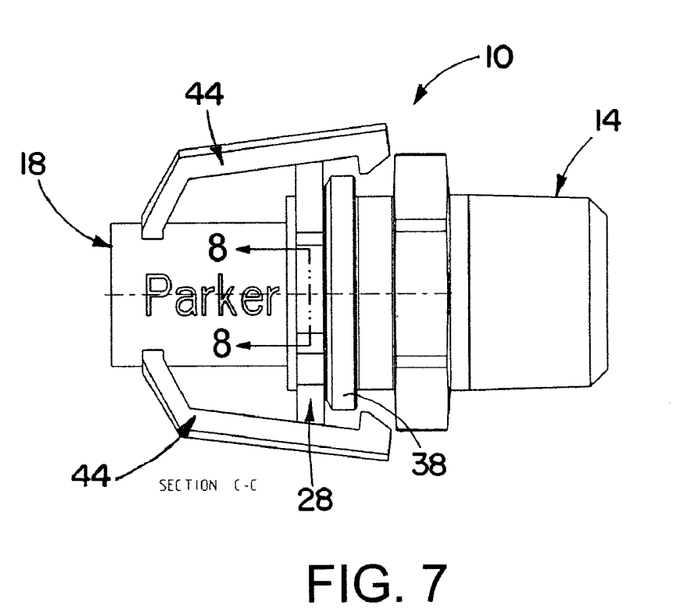
FIG. 7 is a side view of the quick-connect coupling with the rotatable release member in the release position.
Figure 8:
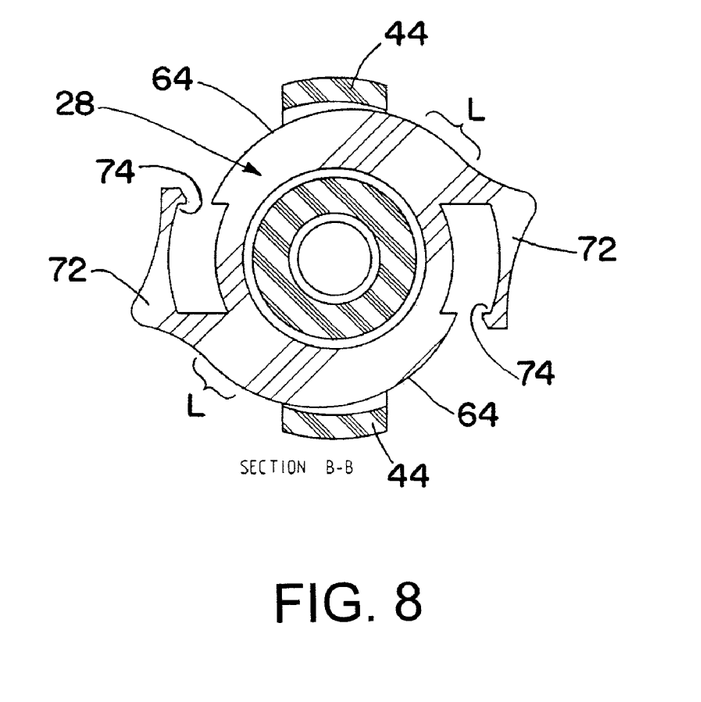
FIG. 8 is a cross-sectional view taken along the line 8-8 in FIG. 7 of the push-to connect coupling with the rotatable release member in a release position.

In FIGS. 7 and 8, the rotatable release member 28 is in a release position and the latch members 44 are in the unlatching position. It will be appreciated that in some configuration the latch members 44 need not be physically disengaged from the catch 38 when in the unlatching position.

In the release position shown in FIGS. 7 and 8, the rotatable release member 28 may tend to rotate clockwise back to the position shown in FIG. 5 when released. This may occur, for example, when the latch members 44 exert a sufficient radially compressive force against the cam surfaces 64 so as to cause the rotatable release member 28 to rotate. Such rotation generally results from the variable curvature of the cam surfaces 64 causing a ramping effect wherein radially inward pressure applied thereto by the latch members 44 causes the rotatable release member 28 to rotate so as to relieve such pressure by allowing the latch members 44 to move radially inwardly towards their latching position. The tendency for the rotatable release member 28 to return to the position shown in FIG. 5 increases with increasing radial pressure applied by the latch members 44, and with a cam surface 64 having a larger variation in curvature. This feature operates to return the rotatable release member 28 approximately to the position of FIG. 5, thereby decreasing the amount of rotation required by a user to return the rotatable release member 28 to the lock position. As such, upon connection of the coupling parts, a user need only rotate the rotatable release member 28 about 45 degrees clockwise from the position shown in FIG. 5 to the lock position shown in FIG. 4.

It may also be desired that the rotatable release member 28 remain in a release position when released. Accordingly, the rotatable release member 28 can be rotated further counterclockwise from the position shown in FIG. 8 until the follower surfaces 66 of the latch members 44 engage at least a portion of the outer periphery of the rotatable release member 28 labeled L. This portion of the outer periphery L of the rotatable release member 28 has a contour more closely corresponding to the contour of the follower surfaces 66. Accordingly, the ramping effect is non-existent or less dramatic and the rotatable release member 28 tends to remain in such release position when moved thereto and released.

Alternatively or additionally, the outer periphery L of the rotatable release member 28 can be provided with a detent mechanism for retaining the rotatable release mechanism in a release position. For example, one or more grooves or protrusions (not shown) can be provided on the outer periphery of the rotatable release mechanism for mating with a respective groove or protrusion (not shown) on the following surface of a latch member 44 when the rotatable release mechanism is in a release position.

Such feature of maintaining the rotatable release member 28 in a release position can be desirable for many applications such as, for example, when new coupling units 10 are shipped to an end user for assembly. Further, a user can separately rotate the release member to a release position, and then subsequently disconnect the coupling parts from each other. In other words, there is no need to simultaneously operate the release member and disconnect the coupling parts from each other.

Returning now to FIGS. 4-7, the return of the rotatable release member 28 to the locked position will be described. As the rotatable release member 28 is rotated clockwise from the position in FIG. 7 to the position in FIG. 5, the latch members 44 return radially inwardly to the latch position. Angled surfaces 76 on the lock members 72 impinge upon the latch members 44 and cause the lock members 72 to expand radially outwardly to clear the latch members 44. Once the rotatable release member 28 is rotated clockwise a sufficient distance, the lock member catches 74 clear the latch members 44 and the lock members 72 return to their normal radial position with the latch members 44 now locked in place by the lock members 72. It will be appreciated that the lock members 72 can be configured to generate an audible click when the lock member catches 74 engage the latch member 44 to thereby provide an audible indication to a user that the rotatable release member 28 is in the lock position.

The quick connect coupling 10 can be provided with one or more mechanical lock-out mechanisms for preventing cross-coupling of the male 18 and or female 14 coupling parts with other coupling parts. One such lock-out mechanism includes a groove or protrusion 80 in an axial end face of the rotatable release member 28 configured to cooperate with an axial groove or protrusion on a mating axial end face of the female coupling part 14 and/or the axial end face of the female coupling part 14 itself.

Another lock-out mechanism that can be provided includes using a rotatable release member 28 of a specific axial thickness. It will be appreciated that for a rotatable release member 28 of a given axial thickness, the distance between the catch engaging surfaces 48 of the latch members 44 and the axial end face of the rotatable release mechanism against which the female coupling part engages is fixed. Thus, in order for the latch members 44 to engage the catch 38, the distance between the axial end face of the female part 14 and the catch 38 must be roughly the same as or less than the distance between the catch engaging surfaces 48 of the latch members 44 and the axial end face of the rotatable release mechanism. Otherwise, when the female 14 and male 18 coupling parts are connected, the latch members 44 will not engage the catch 38. By providing male couplings 18 with rotatable release members 28 of various axial thicknesses, the female coupling parts to which such male coupling parts can connect can be controlled.

Further, it will be appreciated that the axial length of the socket 34 of a female part 14 can also be used to prevent coupling with male parts 18. For example, a male part 18 having a nipple portion that is longer than the axial length of the socket 34 can not be inserted sufficiently into the female portion 14 so as to allow the latch members 44 to engage the catch 38. It will be appreciated that the length of the nipple portion can be effectively changed by using rotatable release members having different axial thicknesses, as described above. Accordingly, by configuring the axial length of the socket 34 and/or the length of the nipple portion of the male part 18 both the female 14 and male couplings can be made to mate with only certain other coupling parts. Thus, when the quick-connect fittings are used in systems having supply and return lines, for example, cross coupling of the supply and return lines can be prevented by using couplings with the above-described lock-out mechanisms.

It should be appreciated that although the drawing and description refer to a particular arrangement of the rotatable release member 28, latch members 44, and female 14 and male 18 coupling parts, other configurations are possible. For example, the rotatable release member 28 and/or latch members 44 could be provided on the female coupling part 14 instead of the male coupling part 18 as illustrated. Further, although the illustrated catch 38 is non-moving, it could instead be formed on or part of other devices including, for example, a radially movable latch member, the catch 38 being disposed opposite the latch member 44 for engagement therewith.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

The invention claimed is:

1. A quick connect coupling comprising:
   first and second coupling parts connectable to each other for enabling fluid communication between respective fluid flow passages of the first and second parts;
   an interlock mechanism for interlocking the coupling parts in a connected state, the interlock mechanism including a catch associated with one of the coupling parts, and a latch member associated with the other of the coupling parts, the latch member configured to interlock with the catch when the first and second coupling parts are connected to thereby restrict disconnection of the coupling parts; and
   a rotatable release member on one of the first or second coupling parts rotatable between a first position allowing the latch member to interlock with the catch and a second position holding the latch member in an unlatching position to allow separation of the first and second coupling parts;
   wherein the rotatable release member further includes a lock member, the lock member configured to restrict movement of the latch member out of engagement with the catch; and
   wherein the lock member has a lock member catch configured to engage a surface of the latch member when the rotatable release member is in the first position, the lock member catch configured to restrict rotation of the rotatable release member from the first position to the second position.

2. A quick connect coupling as set forth in claim 1, wherein the rotatable release member has a cam surface engaging a follower surface on the latch member, whereby the latch member will be progressively urged towards the unlatching position as the release member is rotated to the second position.

3. A quick connect coupling as set forth in claim 1, wherein the cam surface is radially interposed between the latch member and a body of the coupling with which the latch member is associated.

4. A quick connect coupling as set forth in claim 1, wherein the rotatable release member includes a stop surface engageable with a cooperating surface on the latch member for preventing rotation of the rotatable member beyond the second position.

5. A quick connect coupling as set forth in claim 1, wherein the lock member is cantilevered and extends circumferentially and spaced apart from an annular body of the rotatable member, and wherein the lock member is configured to radially restrain the latch member against radial outward movement when the rotatable release member is rotated to the first position.

6. A quick connect coupling as set forth in claim 1, wherein the release member includes a seal on an axial end face thereof for sealing the rotatable release member against the first or second coupling part.

7. A quick connect coupling as set forth in claim 1, further comprising cooperative lock-out members associated with each of the coupling parts for preventing cross-coupling of at least one of the first or second coupling parts with a different respective coupling part not equipped with a lock-out member.

8. A quick connect coupling as set forth in claim 7, wherein the cooperating lockout members include an axial protrusion on one coupling part configured to be received in an axial recess of the other coupling part to permit connection of the coupling parts but prevent connection of other coupling parts without such protrusion or groove.

9. A quick connect coupling as set forth in claim 7, wherein the cooperating lockout members includes a rotatable release member having a given axial thickness, the axial thickness of the rotatable release member determining whether the coupling part associated with the rotatable release member will couple with another coupling part.

10. A quick connect coupling as set forth in claim 1, wherein the rotatable release member is rotatably supported on a cylindrical portion of coupling part with which it is associated.

11. A quick connect coupling as set forth in claim 1, wherein the latch member is cantilevered and extends axially from a body of the coupling with which the latch is associated.

12. A quick connect coupling as set forth in claim 1, wherein the rotatable release member has at least one concave outer peripheral surface thereof for facilitating manual rotation.

13. A quick connect coupling as set forth in claim 5, wherein a distal end of the cantilevered lock member remote the annular body includes the lock member catch.

14. A quick connect coupling comprising:
   first and second coupling parts connectable to each other for enabling fluid communication between respective fluid flow passages of the first and second parts;
   an interlock mechanism for interlocking the coupling parts in a connected state, the interlock mechanism including a catch associated with one of the coupling parts, and a latch member associated with the other of the coupling parts, the latch member configured to interlock with the catch when the first and second coupling parts are connected to thereby restrict disconnection of the coupling parts, and to disengage the catch when shifted radially outwardly from the catch; and
   a rotatable lock member on one of the first or second coupling parts operable to radially restrain the latch member against radial outward movement when in a lock position and to permit radial outward movement of the latch member when in an unlocked position;
   wherein the rotatable lock member has a body portion and a lock arm extending from the body portion, the lock arm having a radial inner surface configured to engage a radially outer surface of the latch when the rotatable lock member is rotated to the lock position; and
   wherein the lock arm has a lock member catch configured to engage a surface of the latch member when the rotatable release member is in the lock position, the lock member catch configured to restrict rotation of the rotatable release member from the lock position to the unlocked position.

15. A quick connect coupling as set forth in claim 14, wherein the lock arm and body together define a slot into which at least a portion of the latch is received when in the lock position.

16. A quick connect coupling as set forth in claim 14, wherein at least one of the lock arm and latch member is resilient.

17. A quick connect coupling as set forth in claim 14, wherein the rotatable lock member and the rotatable release member are provided on a common rotating member.

18. A quick connect coupling as set forth in claim 14, wherein the lock member is cantilevered and extends circumferentially and spaced apart from an annular body of the rotatable member, and wherein a distal end of the cantilevered lock member remote the annular body includes the lock member catch.

19. A coupling half comprising:
   a body having a fluid flow passage for enabling fluid communication with a respective fluid flow passage of a mating coupler half;
   a latch member for engaging a catch on the mating coupler half when connected thereto, the latch member movable between a latch position for engaging the catch and an unlatching position for disengaging the catch; and
   a rotatable release member supported by the body and rotatable between a first position whereat the latch member is in a latching position, and a second position whereat the latch member is in an unlatching position, whereby when the release member is moved to second position and released it restricts movement of the latch member to its engaged position;
   wherein the rotatable release member further comprises a lock member, the lock member configured to restrict movement of the latch member out of engagement with the catch; and
   wherein the lock member has a lock member catch configured to engage a surface of the latch member when the rotatable release member is in the latching position, the lock member catch configured to restrict rotation of the rotatable release member from the latching position to the unlatching position.

20. A coupling half as set forth in claim 19, wherein the rotatable release member has a cam surface engaging a follower surface on the latch member, whereby the latch member will be progressively moved out of engagement with the catch as the release member is rotated to the second position.

21. A coupling half as set forth in claim 20, wherein the cam surface is radially interposed between the latch member and a body of the coupling with which the latch member is associated.

22. A coupling half as set forth in claim 19, wherein the rotatable release member includes a stop surface engageable with a cooperating surface on the latch member for preventing rotation of the rotatable member beyond the second position.

23. A coupling half as set forth in claim 19, wherein the lock member is cantilevered and extends circumferentially and spaced apart from an annular body of the rotatable member, and wherein the lock arm is configured to radially restrain the latch member against radial outward movement when the rotatable release member is rotated to the first position.

24. A coupling half as set forth in claim 23, wherein a distal end of the cantilevered lock member remote the annular body includes the lock member catch.

25. A coupling half as set forth in claim 19, wherein the release member includes a seal on an axial end face thereof for sealing the rotatable release member against the mating coupler half when connected thereto.

26. A coupling half as set forth in claim 19, wherein the release member includes an axial groove or protrusion on an end face thereof for mating with a corresponding groove or protrusion on a mating coupling part when the parts are in the connected state, the axial groove or protrusion thereby providing a mechanical lockout of coupling parts.

* * * * *